(12) United States Patent
Bitzer et al.

(10) Patent No.: US 11,407,545 B2
(45) Date of Patent: Aug. 9, 2022

(54) SEALING DEVICE AND METHOD FOR SEALING A LID MATERIAL TO SEALING AREAS OF A BLISTER WEB OR OF A BLISTER CAP

(71) Applicant: KOCH Pac-Systeme GmbH, Pfalzgrafenweiler (DE)

(72) Inventors: Juergen Bitzer, Horb a. N. (DE); Michael Dressle, Altensteig (DE); Christian Rothfuss, Baiersbronn (DE)

(73) Assignee: KOCH PAC-SYSTEME GMBH, Pfalzgrafeweiler (DE)

( * ) Notice: Subject to any disclaimer, the term of this patent is extended or adjusted under 35 U.S.C. 154(b) by 320 days.

(21) Appl. No.: 16/361,593

(22) Filed: Mar. 22, 2019

(65) Prior Publication Data

US 2019/0291909 A1    Sep. 26, 2019

(30) Foreign Application Priority Data

Mar. 23, 2018 (EP) .................................. 18163643

(51) Int. Cl.
 B65B 51/14 (2006.01)
 B65B 7/16 (2006.01)
 (Continued)

(52) U.S. Cl.
 CPC .............. B65B 51/14 (2013.01); B29C 65/18 (2013.01); B29C 66/112 (2013.01);
 (Continued)

(58) Field of Classification Search
 CPC ................. B29C 66/112; B29C 66/131; B29C 66/53461; B29C 66/81427;
 (Continued)

(56) References Cited

U.S. PATENT DOCUMENTS 3,864,892 A * 2/1975 Molvar ............. B29C 66/24244
                                                        53/478
2007/0128570 A1* 6/2007 Goto .................... H01L 21/6875
                                                        432/253

(Continued)

FOREIGN PATENT DOCUMENTS

GB          1 057 746 A       2/1967
WO     WO 2011/120715 A1    10/2011
WO     WO 2014/066030 A1     5/2014

OTHER PUBLICATIONS

European Search Report, European Application No. EP 18 16 3643, dated Sep. 11, 2018, 2 pgs.

*Primary Examiner* — Chelsea E Stinson
*Assistant Examiner* — Mary C Hibbert-Copeland
(74) *Attorney, Agent, or Firm* — Dickinson Wright PLLC

(57) ABSTRACT

A sealing device for sealing a lid material to sealing areas of a blister web comprises a first, heated sealing tool and a second sealing tool arranged opposite each other and movable relative to each other. A first intermediate element of elastic material is attached to the first sealing tool on a side facing the second sealing tool, and a second intermediate element of thermally-insulating material is attached to the second sealing tool on a side facing the first sealing tool. The first and second sealing tools are movable relative to each other between an opened position and a closed position, in which at least sections of the first intermediate element and of the second intermediate element exert pressure on each other. In the closed sealing position, the first intermediate element rests on the lid material and the second intermediate element rests on lands of the blister web.

18 Claims, 3 Drawing Sheets

(51) Int. Cl.
*B29C 65/00* (2006.01)
*B29C 65/18* (2006.01)
*B65B 51/10* (2006.01)
*B29L 31/00* (2006.01)

(52) U.S. Cl.
CPC ...... *B29C 66/131* (2013.01); *B29C 66/53461* (2013.01); *B29C 66/81427* (2013.01); *B29C 66/81457* (2013.01); *B29C 66/81821* (2013.01); *B65B 7/164* (2013.01); *B29C 66/8122* (2013.01); *B29C 66/8167* (2013.01); *B29C 66/81261* (2013.01); *B29C 66/81264* (2013.01); *B29C 66/8416* (2013.01); *B29C 66/919* (2013.01); *B29C 66/91421* (2013.01); *B29L 2031/7164* (2013.01); *B65B 2051/105* (2013.01)

(58) Field of Classification Search
CPC ........ B29C 66/81457; B29C 66/81821; B29C 66/8122; B29C 66/81261; B29C 66/81264; B29C 66/8167; B29C 66/8416; B29C 66/91421; B29C 66/919; B29L 2031/7164; B65B 2051/105
USPC .......................................................... 53/478
See application file for complete search history.

(56) References Cited

U.S. PATENT DOCUMENTS

| | | | |
|---|---|---|---|
| 2014/0116002 A1* | 5/2014 | Denny | B29C 66/8322 53/329.2 |
| 2018/0243996 A1* | 8/2018 | Baltes | B29C 66/8224 |
| 2019/0047735 A1* | 2/2019 | Callahan | B29C 66/849 |

* cited by examiner

SEALING DEVICE AND METHOD FOR SEALING A LID MATERIAL TO SEALING AREAS OF A BLISTER WEB OR OF A BLISTER CAP

RELATED APPLICATIONS

This application claims priority to European Patent Application No. 18 163 643.2, filed on Mar. 23, 2018, entitled "Sealing Device And Method For Sealing A Lid Material To Sealing Areas Of A Blister Web Or Of A Blister Cap", the the contents of which are incorporated herein by reference in their entirety.

FIELD

The present disclosure relates to a sealing device and to a method for sealing a lid material to sealing areas of a blister web or of a blister cap.

BACKGROUND

So-called blister packs are frequently used for the packaging of pharmaceutical products such as tablets or coated tablets but also of small medical devices such as disposable syringes. Blister packs can comprise a single pocket or a plurality of pockets to hold the products or devices. Pockets are usually formed in a film web as the first step. Next, the blister web thus obtained is filled with the product and then sealed with a lid material, usually a lid film. It is also possible to separate the blister web first into individual blister caps and to seal each blister cap individually with a section of lid material.

Because the pharmaceutical industry must meet very strict hygiene standards, the sterility of the packaged products must be guaranteed. For this purpose, the products or devices can be sterilized either before or after they are introduced into the packages. In cases where the product has already been packaged and is then sterilized by the use of steam, for example, the packaging must be gas-permeable, so that the steam for sterilizing the product can pass into the package. Through the use of a gas-permeable packaging, furthermore, the occurrence of condensation inside the packaging can be avoided. This is especially important for the long-term storage of pharmaceutical products, because a dry atmosphere is thus created. At the same time, however, it must be guaranteed that no contaminating microorganisms such as bacterial spores can pass through the gas-permeable packaging from the outside.

Films or nonwovens which are permeable to gases but impermeable to liquids make it possible to sterilize the product arranged and sealed in the blister package, while at the same time they prevent the intrusion of germs and microorganisms. A lid material known from the prior art which is used to seal blister packs and which displays all of the above-described properties is the membrane sold under the trade name "Tyvek" by its manufacturer Du Pont. Because of its special structure, the thickness of a material of this type is subject to extreme variations, which sometimes can amount to as much as 300%. For this reason, the manufacturers face the problem to seal these materials uniformly and reliably over the sealing seam to be produced.

BRIEF SUMMARY

The present disclosure proposes a sealing device of simple design and an associated sealing method by means of which a lid material of varying thickness can be used to seal reliably a blister web or a blister cap.

According to an aspect of the present disclosure, the sealing device serves to seal a lid material to sealing areas of a blister web or of at least one blister cap, wherein the sealing areas of the blister web or of the at least one blister cap surround at least one pocket for holding the product. The sealing device comprises a first, heated sealing tool and a second sealing, which comprises at least one depression for receiving at least one pocket of the blister web or of the at least one blister cap, wherein the first sealing tool and the second sealing tool are arranged opposite each other. The sealing device also comprises a first intermediate element of an elastic material, which is attached to the first sealing tool on the side facing the second sealing tool, and a second intermediate element of a heat-insulating or poorly heat-conducting material, which is different from the material of the first intermediate element, wherein the second intermediate element is attached to the second sealing tool on the side facing the first sealing tool. The first sealing tool with the first intermediate element and the second sealing tool with the second intermediate element are movable relative to each other between an opened position, in which they are a certain distance apart to accommodate the blister web or the at least one blister cap and at least one section of the lid material, and a closed sealing position, in which at least certain sections of the first intermediate element and of the second intermediate element exert pressure on each other. In the closed sealing position, the first intermediate element rests on the lid material and the second intermediate element rests on lands of the blister web.

It has been found that, to achieve a sealing seam with a width of the greatest possible uniformity and with a uniformly strong adhesive bond between lid material of variable thickness and the blister web or the blister cap, it is necessary for the pressure to be applied strongly and uniformly and also for a high, uniform sealing temperature to be used. The first sealing tool, to which the elastic first intermediate element is attached, and the second sealing, to which the thermally-insulating second intermediate element is attached, work advantageously together in such a way that the first, elastic intermediate element equalizes the occurring thickness differences of the lid material, whereas the second, thermally-insulating intermediate element prevents the heat applied to the seam from dissipating via the second sealing tool, which is usually made of aluminum. Thus the lid material can be sealed at a uniformly high sealing temperature to the blister web or blister cap.

With this configuration, the sections of the lid material and of the blister web or blister cap can be pressed against each other during the sealing operation with sufficient pressure to achieve a strong sealing bond. While the sealing device is arranged in the opened position, the previously heated first intermediate element can cool, which has the effect of preventing the elastic material from overheating and of avoiding premature wear of the first intermediate element.

The facing surfaces of the first sealing tool and of the second sealing tool are preferably flat, parallel surfaces, on which the intermediate elements are arranged.

In a preferred embodiment, the first intermediate element consists of a silicone elastomer. The silicone elastomer offers the advantages that it is heat-resistant up to 200° C. and that the material properties, especially the elasticity, of the silicone elastomer are largely independent of temperature within the range of the sealing temperatures.

In a preferred embodiment, the first intermediate element has a thickness in the range of 0.3-2 mm, more preferably in the range of 0.5-1 mm. The stated thickness range is calculated in such a way that the first intermediate element can equalize the thickness differences of the lid material and nevertheless can be heated quickly because of the thinness of the layer.

In a preferred embodiment, the first intermediate element has a Shore hardness of 60-80 Shore A, more preferably of 65-75 Shore A, measured according to DIN 53 505. This guarantees that sufficient pressure is exerted on the lid material, whereas at the same time the elasticity is sufficient to equalize the differences in the thickness of the lid material.

If the first intermediate element on the surface of the first sealing tool is molded onto the tool, an optimal bond is present for the purpose of transferring heat from the first sealing tool to the first intermediate element. At the same time, this bond ensures that the transferred heat is distributed uniformly over the surface of the first intermediate element. No use is made of any additional connecting elements which could create thermal bridges. To create the largest possible surface area for the molding process, the surface of the first sealing tool facing the second sealing tool can be provided with fluting. As a result of the increased bonding area, the heat transfer from the heated first sealing tool to the first intermediate element is improved, as is the adhesion also.

The second intermediate element, furthermore, preferably consists of a polyurethane elastomer.

The second intermediate element preferably has a thickness in the range of 5-15 mm, more preferably in the range of 8-12 mm.

The second intermediate element preferably has a Shore hardness of 80-100 Shore A, more preferably of 85-95 Shore A, measured according to DIN 53 505. Thus there is still a certain amount of elasticity present, but a sufficient amount of pressure can still be exerted on the sealing site.

The thermal conductivity of the material of the first intermediate element is preferably greater than the thermal conductivity of the second intermediate element.

The material of the second intermediate element preferably has a thermal conductivity in the range of 0.19-0.25 W/(m·K), more preferably in the range of 0.21-0.23 W/(m·K). This makes it possible to achieve optimal sealing results.

If the first sealing tool is arranged above the second sealing tool, a corresponding section of the blister web or the blister can be set down first onto the harder, lower second intermediate element. The first intermediate element can then be moved downward progressively to the lid material and press the lid material against the blister web or the blister cap. As a result, the first intermediate element can bring about a direct and continuous equalization of the different thicknesses of the lid material. This can be done as the lid material is simultaneously being heated by the first intermediate element during the pressing operation.

It is advantageous, furthermore, for the second intermediate element to be screwed to, or snapped into place on, the second sealing tool. Screwing or a mechanical snapping-into-place is possible because of the required elastic hardness of the second intermediate element and because of its thickness, which is greater than the thickness of the first intermediate element.

According to an advantageous embodiment, the first intermediate element comprises at least one through-opening, which is formed to correspond to the at least one depression in the second sealing tool, and the second intermediate element also comprises at least one through-opening. The first intermediate element and the second intermediate element thus each form a peripheral land. The peripheral lands are formed to correspond to the course of the peripheral sealing seam to be formed. Thus the heating and pressing of the lid material onto the section of the blister web or the blister cap can effectively occur exclusively along the seam to be formed. The lid material is not heated in the area of the depressions, i.e. the lid material is protected in these areas.

Alternatively, the first intermediate element can be configured as a plate. In this case, it is a one-piece unit and has no through-opening. The advantage of this configuration is that the first intermediate element is easier to manufacture and easier to attach.

According to another aspect of the invention, a method for sealing a lid material to sealing areas of a blister web or of at least one blister cap is provided, such that the sealing areas of the blister web or of the at least one blister cap surround at least one pocket for holding a product. The method comprises the steps of:

providing a sealing device as described above;

arranging a section of the blister web or the at least one blister cap and at least a section of the lid material between the first sealing tool and the second sealing tool, while these are arranged in an opened position;

actuating the sealing device to bring the first sealing tool and the second sealing tool relative to each other into a closed sealing position, in which the first intermediate element rests against the lid material and the second intermediate element rests against lands of the blister web or of the blister cap, as a result of which the lid material is pressed against the lands of the blister web or of the blister cap in an area of corresponding sections of the first and second intermediate elements;

heating the first sealing tool and the first intermediate element during or after the step of actuating the sealing device, thus heating the lid material to seal the lid material to the lands of the blister web or of the blister cap; and actuating the sealing device to bring the first sealing tool and the second sealing tool relative to each other back into the opened position.

In this method, to obtain a sealing seam of the most uniform possible width and to obtain the most uniform possible bond between the lid and the blister web or the blister cap, uniform pressure is exerted over the entire sealing surface inasmuch as the heated, elastic first intermediate element can rest directly against, and conform to, the lid material of varying thickness. The resting-against and conforming-to and the heating are carried out by one and the same element, namely, by the first intermediate element. Upon contact with the thicker sections of lid material, the first intermediate element is compressed more than it is in the places where it contacts thinner sections of the lid material, so that, ultimately, thicker and thinner sections are subjected essentially to equal applied pressures, and the lid material can be sealed to the blister web or the blister cap uniformly along the seam. At the same time, furthermore, the flow of heat is blocked by the thermally-insulating second intermediate element, so that most of the thermal energy is available for the sealing operation and does not dissipate.

For the purpose of arranging the first sealing tool and the second sealing tool in the sealing position, if is preferred that only the first sealing tool be moved toward the second sealing tool, while the second sealing tool is kept stationary.

An advantageous sequence of the individual method steps consists in first holding a section of the blister web in position by resting it on the second, stationary sealing tool and then initiating the pressing and sealing operation. The sealing operation can therefore be carried out with precision.

It is preferable for the first intermediate element to be heated to a temperature in the range of 120-170° C., preferably in the range of 145-155° C. Optimal sealing results can thus be obtained.

DETAILED DESCRIPTION

Figure 1:
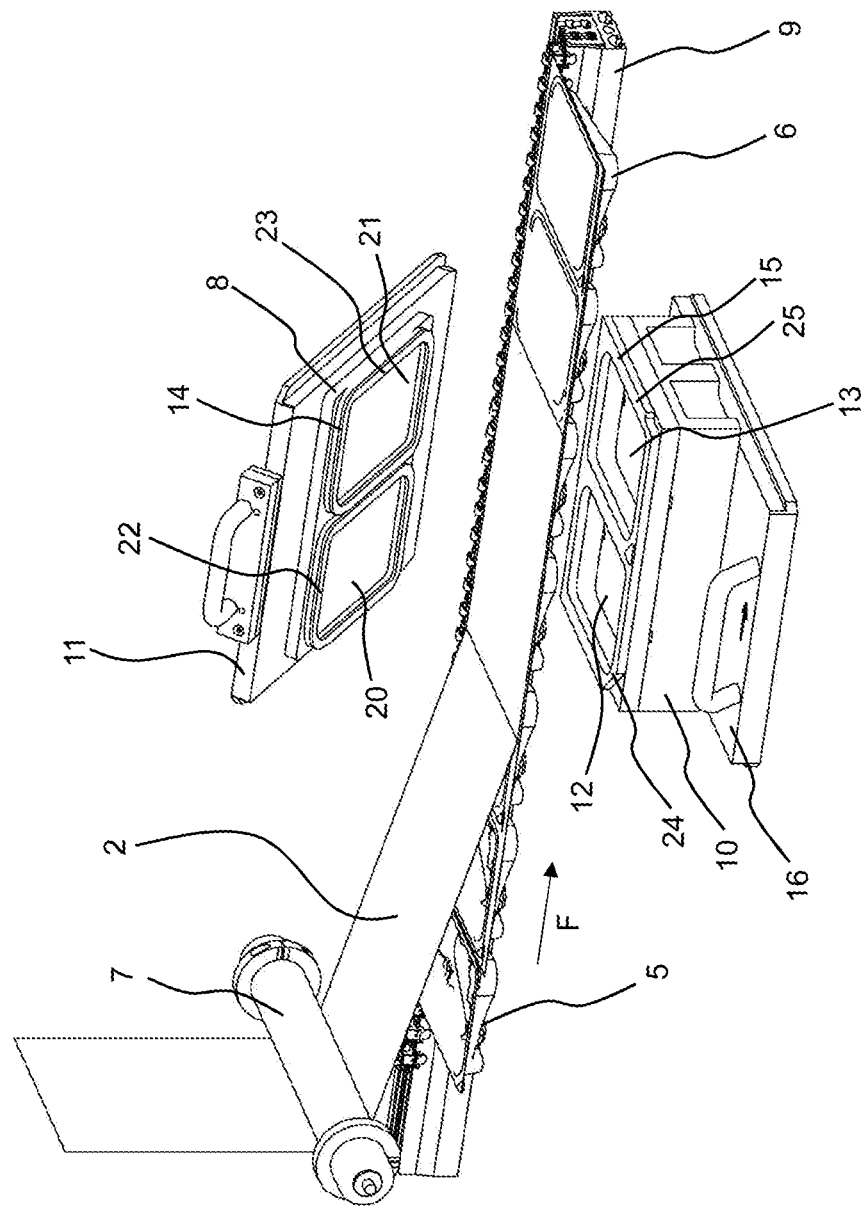
FIG. 1 shows a schematic diagram, in perspective, of a first embodiment of a sealing device according to the invention.

FIG. 1 shows a schematic diagram, in perspective, of the basic structure of a section of a packaging system with an embodiment of the sealing device according to the invention. As can be derived from FIG. 1, a continuous blister web 5 with several pockets 6 formed in it, which are preferably filled with medical or pharmaceutical products (not shown), is moved, preferably in stepwise fashion, in a conveying direction F and brought up to the sealing device. A lid material 2, which serves to seal the pockets 6 and which is in the form of a continuous web, is deflected around a deflection roller 7 and moved, also preferably in stepwise fashion, in the conveying direction F. In the sealing device, the blister web 5 and the lid material 2 are guided between a first, upper sealing tool 8, and a second, lower sealing tool 10. The blister web 5 and the lid material 2 are preferably transported by means of the same feed device 9, especially preferably by means of a feed device 9 arranged downstream from the sealing device. By means of this feed device 9, the blister web 5 is pulled together with the lid material 2 in the conveying direction F, because the blister web 5 and the lid material 2 have already been joined together by the previously completed sealing process. As a result, as-yet unsealed sections of the blister web 5 and the lid material 2 arrive in the sealing device. Other types and arrangements of feed devices, however, can also be used.

The sealing device forms part of a packaging system, which can comprise additional stations and pieces of equipment, not described here, such as a forming station for forming the pockets 6 in the blister web 5, a filling station for filling the pockets 6 with products, a stamping station, and conveying and transfer devices, etc. In the sealing device, the section of the blister web 5 filled with product is sealed by the lid material 2. The sealing process occurs through the use of heat, wherein the lid material 2 is preferably sealed to the blister web 5 along a seam, which runs around each pocket 6.

The lid material 2 can be a film, a nonwoven, a medical paper, or a combination of two or more of these, possibly of varying thickness. The lid material 2 is preferably permeable to gases but impermeable to liquids. The lid material 2 preferably combines the properties of a conventional aluminum foil or plastic film with the material properties of paper and textiles. One possible lid material 2 is produced by the use of a flash spunbond process, in which a three-dimensional network of fine fibers is formed first; this is then converted by mechanical means into an isotropic fiber arrangement. By means of heat and pressure, finally, the individual fiber layers are consolidated. Additional treatment steps such as the application of additional coatings, corona irradiation, etc., are possible as options. Because of the special way in which the material is produced, the thickness of the lid material fluctuates, sometimes by up to 300%. An example of a lid material 2 of this type is produced and sold by Du Pont under the name "Tyvek".

As can be seen in FIG. 1, the sealing device according to the invention comprises the first sealing tool 8 and the second sealing tool 10, wherein the first sealing tool 8 is preferably arranged above the second sealing tool 10. The first sealing tool 8 is a heated sealing tool. The first sealing tool 8 is heated by a heating device (not shown), which can be a heating cartridge, a heating plate, an induction heater, etc. A control unit (not shown) controls the operation of the heating device. In contrast, the second sealing tool 10 is preferably not heated and comprises one or more depressions 12, 13 to accommodate a corresponding number of pockets 6 of the blister web 5.

In FIG. 1 (and also in the diagram of a different embodiment in FIG. 4), the upper sealing tool 8 is shown pivoted upward to expose the structure of its bottom surface. This serves only to provide a better illustration of the details and does not represent a situation occurring in reality. The upper and lower sealing tools 8, 10 are always oriented so that they are parallel to one another when in the installed, operational state.

Figure 2:
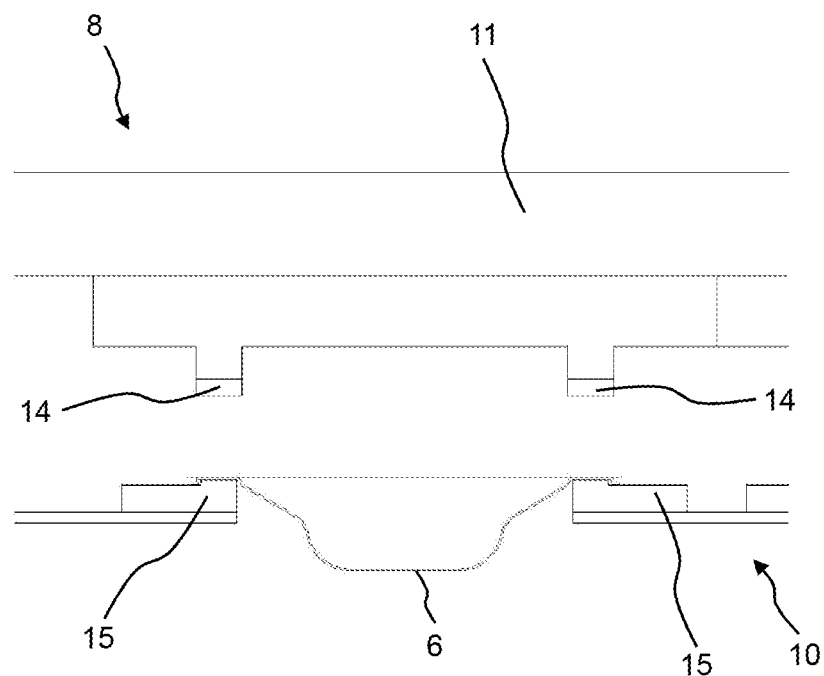
FIG. 2 shows a schematic, cross-sectional view of a section of the sealing device of FIG. 1, wherein the sealing device can be seen in the opened position.

FIG. 2 shows a situation in which the first sealing tool 8 and the second sealing tool 10 are arranged opposite each other and a certain distance apart. On the side of the first sealing tool 8 facing the second sealing tool 10, a first intermediate element 14 is attached. The first sealing tool 8 functions together with the first intermediate element 14 as a thermally active element, wherein preferably the heated sealing tool 8 heats the first intermediate element 14 to the sealing temperature.

On the side of the second sealing tool 10 facing the first sealing tool 8, a second intermediate element 15 is attached. The second sealing tool 10 with the second intermediate element 15 functions as a counter-element, against which a section of the blister web 5 rests. According to FIG. 1, the first and second sealing tools 8, 10 comprise base plates 11, 16, to which the intermediate elements 14, 15 are attached. The base plates 11, 16 can also be made up of several elements, plates, and/or layers. There are many possible concrete ways in which the skilled person can construct base plates 11, 16 which can be used within the scope of the invention.

The first intermediate element 14 is preferably attached to the first sealing tool 8 in such a way that, when the first sealing tool 8 is heated, the intermediate element 14 is also heated. Whereas the first intermediate element 14 consists of an elastic material, the second intermediate element 15 is produced from a thermally-insulating material or a material with poor thermal conductivity.

A silicone elastomer is preferably used for the first intermediate element 14, and a polyurethane elastomer is preferably used for the second intermediate element 15. In general, however, it can be said that the first intermediate element 14 consists of a material which is more elastic than the material of the second intermediate element 15, whereas the second intermediate element 15 consists of a material which conducts heat more poorly than the material of the first intermediate element 14.

The layer thickness of the first intermediate element 14 is preferably smaller than the layer thickness of the second intermediate element 15. The heating of the first intermediate element 14 can therefore proceed more quickly and more directly, whereas the second intermediate element 15, because it is thicker than the first intermediate element 14, prevents or limits the dissipation of the heat into the second sealing tool 10. The flow of heat can therefore be blocked more effectively and applied in the area of the sealing seam to be produced.

The first intermediate element 14 preferably comprises one or more through-openings 20, 21, which are configured to correspond to the one or more depressions 12, 13 in the second sealing tool 10. In other words, the first intermediate element 14 preferably comprises a plurality of peripheral lands 22, 23. The second intermediate element 15 will then always comprise a plurality of peripheral lands 24, 25 also, each of which corresponds to the course of the peripheral seam to be formed. The first intermediate element 14 can be attached in the form of several separately formed peripheral lands to the first sealing tool 8, or it can be configured as a one-piece unit and attached as such to the first sealing tool. Alternatively, the first intermediate element 14 can be configured as a plate.

In the opened position shown in FIG. 2, the first sealing tool 8 and the second sealing tool 10 are arranged a certain distance apart to accommodate a section of the blister web 5 and a section of the lid material 2. In the closed sealing position of the sealing device shown in FIG. 3, the lands 23 of the first intermediate element 14, the sections of lid material 2 and blister web 5 to be sealed, and the lands 24, 25 around the depressions 12, 13 in the second sealing tool 10 lie directly on each other.

The first and second sealing tools 8, 10 are moved relative to each other, preferably mechanically, to produce the sealing position. One of the sealing tools 8, 10 can be stationary, and only the other one can be moved as needed; or both sealing tools 8, 10 can be moved toward each other. A concrete possibility consists in that the upper sealing tool 8 is moved by the use of a hydraulic cylinder, and the lower sealing tool 10 is moved by the use of a knee lever. Another concrete possibility consists in that the upper sealing tool 8 and the lower sealing tool 10 are moved by the use of a double-cam mechanism. In the case that a sealing tool, preferably the lower sealing tool 10, is fixed or stationary, this sealing tool is preferably supported elastically, and only the upper sealing tool 8 is supported movably.

Figure 3:
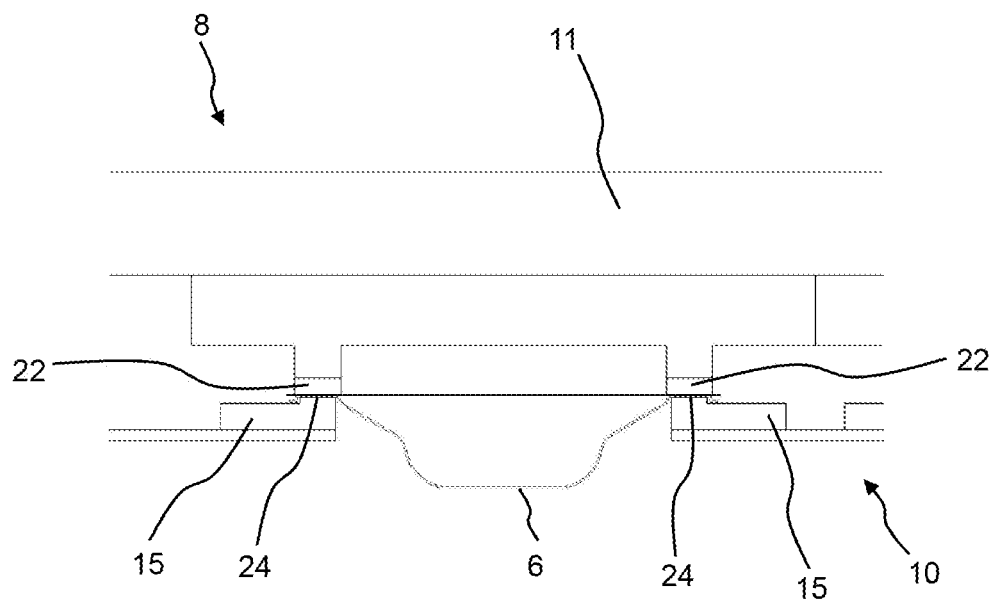
FIG. 3 shows a schematic cross-sectional view of a section of the sealing device of FIG. 1, wherein the sealing device can be seen in the closed, sealing position.

In the sealing position according to FIG. 3, the intermediate element 14 contacts a section of the lid material 2, and the second intermediate element 15 of the second sealing tool 10 contacts a section of the blister web 5. Thus the first sealing tool 8 presses down from above against the lid material 2, which in turn is pressed against the blister web 5, which in turn is pressed against the second sealing tool 10 functioning as a counter-element.

In the sealing position, heat is transferred from the first sealing tool 8 to the intermediate element 14, which transfers the heat in turn to the lid material 2 and the blister web 5, so that the lid material 2 is bonded to the blister web 5 as it is being pressed down simultaneously.

In the following, the method for sealing the lid material 2 to the blister web 5 in a sealing device is described again in greater detail on the basis of FIGS. 2 and 3.

As shown in FIG. 2, the first sealing tool 8 and the second sealing tool 10 are first arranged a certain distance apart. In this configuration, a thermoformed blister web 5 with at least one pocket 6 and a section of a lid material 2 are arranged between the first sealing tool 8 and the second sealing tool 10. As can also be seen in FIG. 2, the section of the blister web 5 faces the second intermediate element 15 on the second sealing tool 10, and the section of the lid material 2 faces the first intermediate element 14 on the first sealing tool 8.

The sealing device is now actuated, starting from the state shown in FIG. 2, so that the first sealing tool 8 and the second sealing tool 10 are moved relative to each other, i.e., toward each other, as a result of which they arrive in the sealing position shown in FIG. 3. When the sealing device is closed, the first intermediate element 14 contacts the lid material 2 and presses it against the blister web 5. Primarily because of the elasticity of the first intermediate element 14, any thickness variations of the lid material 2 are thus equalized, and the lid material 2 is subjected to uniform pressure over the sections to be sealed.

In the sealing position, the second intermediate element 15 is also pressed against a section of the blister web 5. No later than this the first intermediate element 14 is heated to seal a section of the blister web 5 to a section of the lid material 2.

Finally, the sealing device is actuated to move the first sealing tool 8 and the second sealing tool, still in the positions shown in FIG. 3, back away from each other again. The blister web 5 is now sealed to the lid material 2 and can be moved out of the sealing device and sent to, for example, a stamping device. The sealing device is back in the position shown in FIG. 2 again.

The first intermediate element 14 is preferably heated for the duration of the heat-sealing operation. Outside the heat-sealing operation, i.e., when the first sealing tool 8 and the second sealing tool 10 are a certain distance apart, the first sealing tool 8 is not or no longer actively heated. The first intermediate element 14 can also be heated continuously, however.

Figure 4:
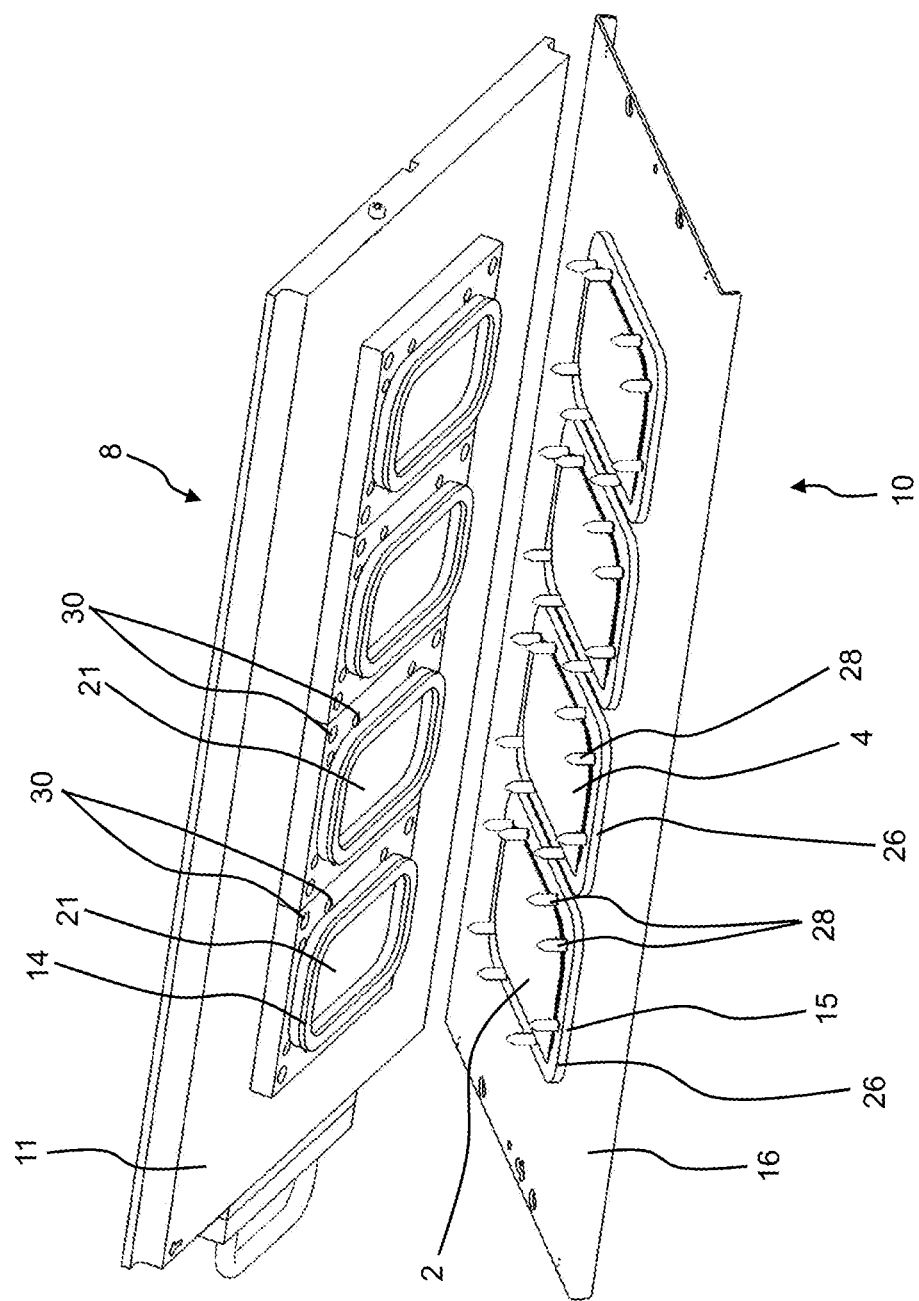
FIG. 4 shows a schematic diagram, in perspective, of a second embodiment of a sealing device according to the invention.

FIG. 4 shows a schematic diagram, in perspective, of a second embodiment of the sealing device according to the invention. The components of the sealing device correspond to the components shown in FIGS. 1-3 and are therefore provided with the same reference numbers. They therefore do not have to be described again.

In contrast to the embodiment shown in FIG. 1, individual, previously separated blister caps 4, each with a separated section of the lid material 2 to seal the associated pocket 6, are arranged instead of the blister web 5 in the one or more depressions 12, 13. Upward-projecting positioning pins 28 can be arranged on sections 26 of the second sealing tool 10 extending around the second intermediate elements 15. These positioning pins 28 prevent the sections of the lid material 2 and the blister caps 4 to be joined from sliding laterally. When the sealing device is moved into the sealing position, the positioning pins 28 are accommodated in openings 30 in the first sealing tool 8.

The invention claimed is:

1. A sealing device for sealing a lid material of varying thickness to sealing areas of a blister web or of at least one blister cap, wherein the sealing areas of the blister web or of the at least one blister cap surround at least one pocket for holding a product, the sealing device comprising:
   a first, heated sealing tool;
   a second sealing tool, which comprises at least one depression for receiving at least one pocket of the blister web or the at least one blister cap, wherein the first sealing tool and the second sealing tool are arranged opposite each other;
a first intermediate element of an elastic material, which is directly attached to the first sealing tool on a side facing the second sealing tool, wherein the first intermediate element consists of a silicone elastomer and has a thickness in the range of 0.3-2 mm;
a second intermediate element of a thermally-insulating material or a material of poor thermal conductivity, which is different from the material of the first intermediate element, wherein the second intermediate element is directly attached to the second sealing tool on a side facing the first sealing tool, wherein the second intermediate element has a thickness in the range of 5-15 mm;
wherein at least one of the first sealing tool with the first intermediate element and the second sealing tool with the second intermediate element is movable relative to the other sealing tool between an opened position, in which the first and second sealing tools are a certain distance apart to accommodate the blister web or the at least one blister cap and at least one section of the lid material, and a closed sealing position, in which at least sections of the first intermediate element and of the second intermediate element exert pressure on each other,
wherein the first sealing tool and the second sealing tool are arranged and structured in such a way that, in the closed sealing position, the first intermediate element rests directly on the lid material and the second intermediate element rests directly on lands of the blister web or of the at least one blister cap.

2. The sealing device of claim 1, wherein the first intermediate element has a thickness in the range of 0.5-1 mm.

3. The sealing device of claim 1, wherein the material of the first intermediate element has a Shore hardness of 60-80 Shore A, measured according to DIN 53 505.

4. The sealing device of claim 1, wherein the material of the first intermediate element has a Shore hardness of 65-75 Shore A, measured according to DIN 53 505.

5. The sealing device of claim 1, wherein the first intermediate element is molded onto a surface of the first sealing tool.

6. The sealing device of claim 1, wherein the second intermediate element consists of a polyurethane elastomer.

7. The sealing device of claim 1, wherein the second intermediate element has a thickness in the range of 8-12 mm.

8. The sealing device of claim 1, wherein the material of the second intermediate element has a Shore hardness of 80-100 Shore A, measured according to DIN 53 505.

9. The sealing device of claim 1, wherein the material of the second intermediate element has a Shore hardness of 85-95 Shore A, measured according to DIN 53 505.

10. The sealing device of claim 1, wherein the material of the second intermediate element has a thermal conductivity in the range of 0.19-0.25 W/(m·K).

11. The sealing device of claim 1, wherein the material of the second intermediate element has a thermal conductivity in the range of 0.21-0.23 W/(m·K).

12. The sealing device of claim 1, wherein the second intermediate element is screwed to, or snapped into place on, the second sealing tool.

13. The sealing device of claim 1, wherein the first intermediate element comprises at least one through-opening, which is configured to correlate with the at least one depression in the second sealing tool, and the second intermediate element comprises at least one through-opening, wherein the first intermediate element forms at least one peripheral land, and the second intermediate element forms at least one peripheral land, wherein the peripheral lands correlate with each other and are configured to correspond to a course of a peripheral sealing seam to be formed.

14. The sealing device of claim 1, wherein the first intermediate element is configured as a plate, and the second intermediate element comprises at least one through-opening, wherein the second intermediate element forms at least one peripheral land, which is formed to correspond to a course of a peripheral sealing seam to be formed.

15. A method for sealing a lid material to sealing areas of a blister web or of at least one blister cap, wherein the sealing areas of the blister web or of the at least one blister cap surround at least one pocket for holding a product, the method comprising:
providing a sealing device comprising:
a first, heated sealing tool;
a second sealing tool, which comprises at least one depression to receive at least one pocket of the blister web or of the at least one blister cap, wherein the first sealing tool and the second sealing tool are arranged opposite each other;
a first intermediate element consisting of an elastic material, which is directly attached to the first sealing tool on a side facing the second sealing tool, wherein the first intermediate element consists of a silicone elastomer and has a thickness in the range of 0.3-2 mm; and
a second intermediate element consisting of a thermally-insulating material, which is different from the material of the first intermediate element, wherein the second intermediate element is directly attached to the second sealing tool on a side facing the first sealing tool, wherein the second intermediate element has a thickness in the range of 5-15 mm;
wherein at least one of the first sealing tool with the first intermediate element and the second sealing tool with the second intermediate element is movable relative to the other sealing tool between an opened position, in which the first and second sealing tools are a certain distance apart to accommodate the blister web or the at least one blister cap and at least one section of the lid material, and a closed sealing position, in which at least sections of the first intermediate element and of the second intermediate element exert pressure on each other;
wherein the first sealing tool and the second sealing tool are arranged and structured in such a way that, in the closed sealing position, the first intermediate element rests directly on the lid material and the second intermediate element rests directly on lands of the blister web or of the at least one blister cap;
arranging a section of the blister web or the at least one blister cap and at least one section of the lid material between the first sealing tool and the second sealing tool while the first and second sealing tools are arranged in the opened position;
actuating the sealing device to bring the first sealing tool and the second sealing tool relative to each other into the closed sealing position, in which the first intermediate element rests directly against the lid material and the second intermediate element rests directly against lands of the blister web or of the at least one blister cap, as a result of which the lid material is pressed against the lands of the blister web or of the at least one blister cap in an area of corresponding sections of the first and second intermediate elements;

heating the first sealing tool and the first intermediate element during or after the step of actuating the sealing device, thus heating the lid material to seal the lid material to the lands of the blister web or of the at least one blister cap; and actuating the sealing device to bring the first sealing tool and the second sealing tool relative to each other back into the opened position.

16. The method of claim 15, wherein the lid material comprises a varying thickness.

17. The method of claim 15, wherein the first intermediate element is heated to a temperature in the range of 120-170° C.

18. The method of claim 15, wherein the first intermediate element is heated to a temperature in the range of 145-155° C.

\* \* \* \* \*